(12) United States Patent
Baumgardner et al.

(10) Patent No.: US 8,348,046 B1
(45) Date of Patent: Jan. 8, 2013

(54) CONVEYOR BELT CLEANING ASSEMBLY

(75) Inventors: Troy O. Baumgardner, Huron, OH (US); Scott M. Kane, Sandusky, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 13/185,361

(22) Filed: Jul. 18, 2011

(51) Int. Cl.
*B65G 45/18* (2006.01)

(52) U.S. Cl. .......................... 198/496; 198/495; 198/497

(58) Field of Classification Search .................. 198/495, 198/496, 497, 498, 499
See application file for complete search history.

(56) References Cited

U.S. PATENT DOCUMENTS

| | | | |
|---|---|---|---|
| 1,543,411 A * | 6/1925 | Wittig | 198/495 |
| 3,815,728 A | 6/1974 | Vaughan | |
| 3,938,651 A | 2/1976 | Alfred | |
| 4,960,200 A | 10/1990 | Pierce | |
| 5,031,750 A | 7/1991 | Barnes | |
| 5,333,724 A | 8/1994 | Wingfield | |
| 5,355,992 A * | 10/1994 | Baig et al. | 198/495 |
| 5,372,243 A | 12/1994 | King | |
| 5,598,915 A | 2/1997 | Malmberg | |
| 5,649,616 A * | 7/1997 | Stecklow | 198/496 |
| 5,803,232 A | 9/1998 | Fröderberg | |
| 6,651,803 B2 | 11/2003 | Virippil | |
| 6,971,503 B2 | 12/2005 | Thompson | |
| 6,983,510 B1 * | 1/2006 | Hudgins | 198/496 |
| 7,044,287 B1 | 5/2006 | Gray | |
| 2004/0108187 A1 * | 6/2004 | Behymer et al. | 198/497 |

* cited by examiner

*Primary Examiner* — James R Bidwell
(74) *Attorney, Agent, or Firm* — Christensen O'Connor Johnson Kindness PLLC (57) ABSTRACT

Belt cleaning assemblies for a continuous conveyor belt having a pervious belt assembly and top and bottom belt surfaces generally include contact and non-contact cleaning assembles. Continuous conveyor belt systems having belt cleaning assemblies and methods for cleaning continuous conveyor belts are also provided.

12 Claims, 8 Drawing Sheets

CONVEYOR BELT CLEANING ASSEMBLY

BACKGROUND

Various belt cleaning assemblies for continuous conveyor belts designed for food processing are commercially available. However, the inventors have found that these previously designed belt cleaning assemblies have not been optimized to remove residue that accumulates on pervious conveyor belts in continuous food processing systems. Therefore, there exists a need for an improved belt cleaning assembly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a belt cleaning assembly is provided. The belt cleaning assembly is for a continuous conveyor belt having a pervious belt assembly and top and bottom belt surfaces. The assembly generally includes a contact cleaning assembly, including at least one of a brush assembly and a scraper assembly, wherein the contact cleaning assembly has mechanical contact with at least one of the top and bottom surfaces of the conveyor belt. The assembly further includes a non-contact cleaning assembly including a high pressure water spray directed to the conveyor belt, wherein the non-contact cleaning assembly has non-mechanical contact with at least one of the top and bottom belt surfaces of the conveyor belt.

In accordance with another embodiment of the present disclosure, a continuous conveyor belt system having a belt cleaning assembly is provided. The system generally includes a continuous conveyor belt having a pervious belt assembly and first and second belt surfaces. The system further includes a belt cleaning assembly including a contact cleaning assembly including at least one of a brush and a scraper, wherein the contact cleaning assembly has mechanical contact with at least one of the first and second belt surfaces of the conveyor belt, and a non-contact cleaning assembly including a high pressure water spray directed to the conveyor belt, wherein the non-contact cleaning assembly has non-mechanical contact with the conveyor belt.

In accordance with another embodiment of the present disclosure, a method of cleaning a continuous conveyor belt is provided. The method generally includes mechanically cleaning at least one of the first and second surfaces of the conveyor belt using a contact cleaning assembly including at least one of a brush assembly and a scraper assembly. The method further includes hydraulically cleaning the conveyor belt using a non-contact cleaning assembly including a high pressure water spray directed to the conveyor belt, wherein the non-contact cleaning assembly has non-mechanical contact with the conveyor belt.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Embodiments of the present disclosure are directed to conveyor belt cleaning assemblies for continuous conveyor belt systems, for example, in food processing assemblies. In the illustrated embodiment of FIGS. 1-3, a continuous conveyor belt system 10 having a belt cleaning assembly 20 is shown. The belt cleaning assembly 20 is designed and configured to clean a conveyor belt 22 and includes a contact cleaning assembly 24 (see also FIGS. 6A and 6B) and a non-contact cleaning assembly 26 (see also FIG. 5).

Although shown and described as including one contact cleaning assembly 24 and one non-contact cleaning assembly 26 following the contact cleaning assembly 24 in series, it should be appreciated that other configurations are also in accordance with embodiments of the present disclosure. For example, a belt cleaning assembly in accordance with embodiments of the present disclosure may include a first non-contact cleaning assembly, followed by a contact cleaning assembly, followed by a second non-contact cleaning assembly. Further, while particularly useful in food processing systems, it should be appreciated that conveyor belt cleaning systems in accordance with embodiments of the present disclosure are not limited to food related systems.

Figure 1:
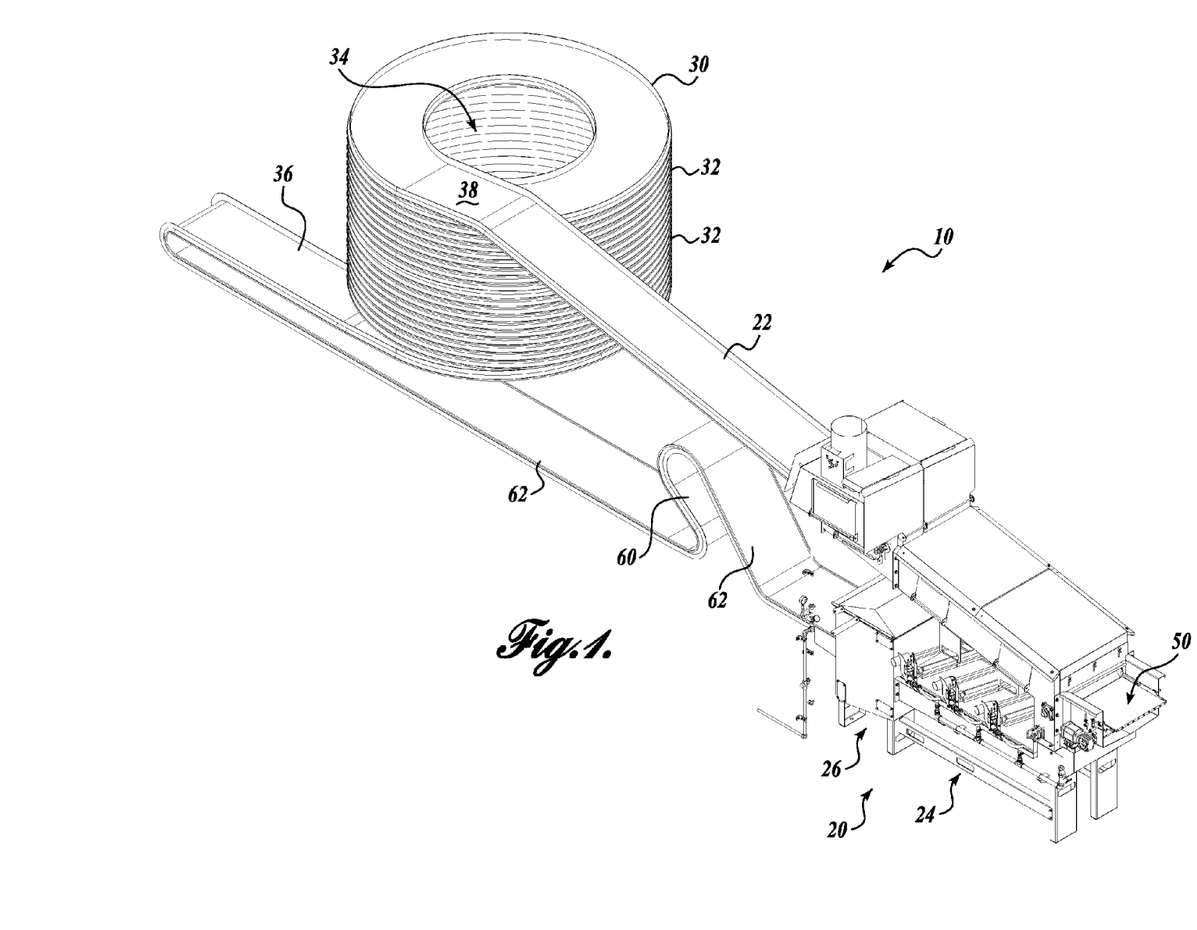
FIG. 1 is an isometric view of a continuous conveyor belt system including a belt cleaning assembly.

In the illustrated embodiment of FIG. 1, the continuous conveyor belt system 10 may be configured to support and transport workpieces, such as food products, in an exemplary cooking oven system. The conveyor belt 22 moves in both spiral and linear patterns in the exemplary cooking system. For example, the conveyor belt 22 may move in a spiral or helical pattern in the cooking oven when in a spiral stack 30, and in a linear pattern at the in-feed and out-feed 36 and 38 of the spiral stack 30 and through the belt cleaning assembly 20. A frame (not shown) may be used to guide the conveyor belt 22 into the formation of the spiral stack 30 and provides support for the spiral stack 30.

In this example, a gaseous cooking medium circulation system (not shown) delivers cooking medium to food products disposed on the spiral stack 30. In that regard, the spiral stack 30 is contained within an oven chamber (not shown), and the circulation system (not shown) circulates cooking medium within the oven chamber. Although described with respect to an exemplary cooking oven system, it should be appreciated that freezing systems or other food processing systems are also within the scope of the present disclosure. It should further be appreciated that the conveyor belt need not travel in a spiral pattern in the oven cooking chamber; for example, linear belt patterns in oven cooking chambers are also within the scope of the present disclosure.

Still referring to FIG. 1, when formed as a spiral stack 30, the conveyor belt 22 is configured into a plurality of superimposed tiers 32 that are stacked on top of each other (i.e., known in the art as a "self-stacking" conveyor belt). In that regard, each tier 32 of the stack 30 forms a pervious annulus, though which gaseous cooking medium may travel. When formed in a spiral stack 30, the plurality of tiers 32 creates an inner cylindrical channel 34, through which the heated gaseous medium may also travel. Food products (not shown) travel on the conveyor belt 22 and are heated by gaseous cooking medium. Exemplary spiral stacks 30 may have any number of tiers 32, typically in the range of about 8 to about 25 tiers.

Figure 4:
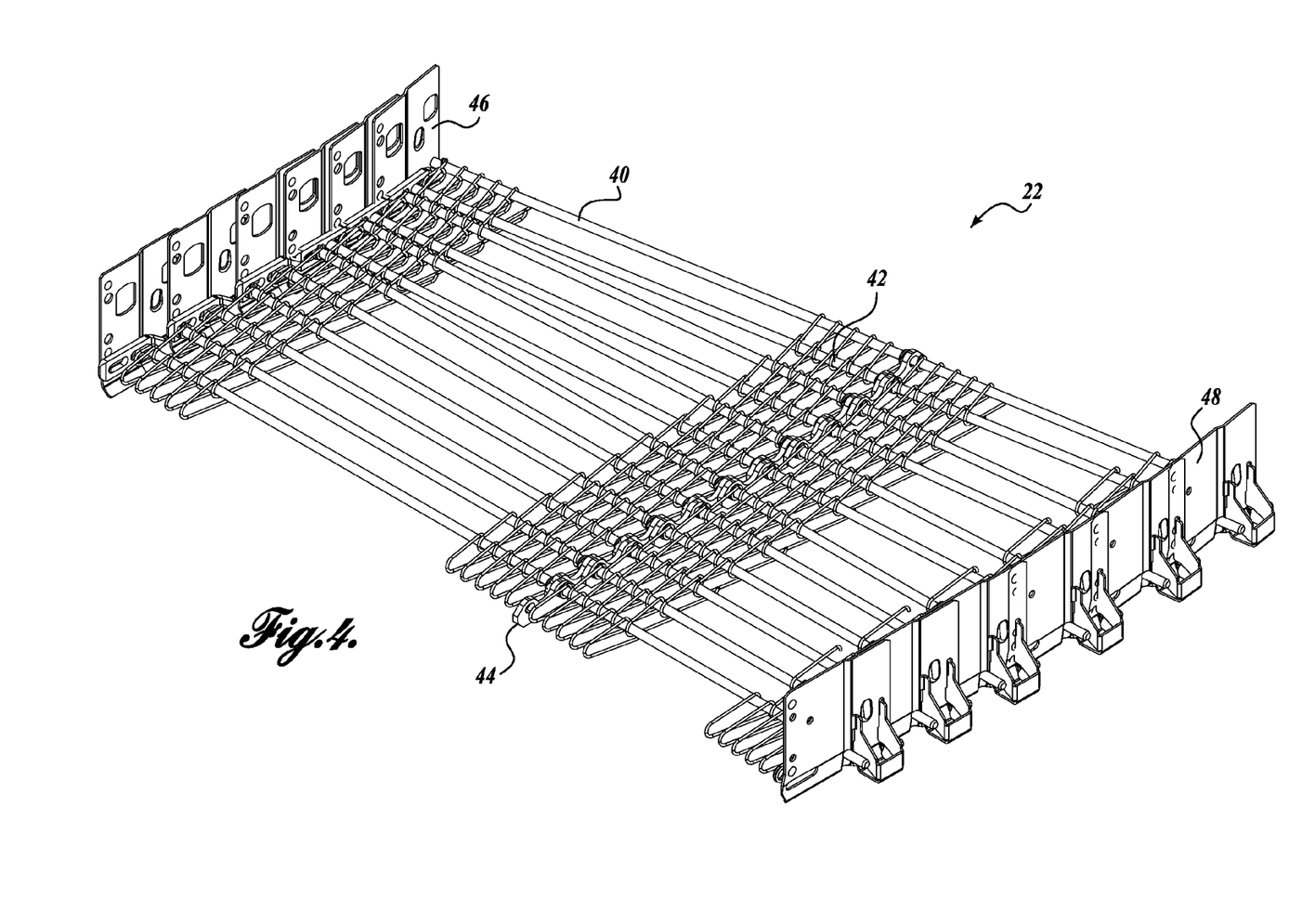
FIG. 4 is a close-up isometric view of a portion of the conveyor belt of FIG. 1.

Referring to FIG. 4, the conveyor belt 22 is a pervious belt formed by a plurality of transverse rods 40 interconnected by a mesh 42, such as a wire mesh, and by a linking system. The linking system including intermediate links 44 (e.g., pulling links), as well as inner and outer links 46 and 48 positioned at the ends of the transverse rods 40. The inner and outer links 46 and 48 are designed to expand and collapse upon each other to enable spiral stacking for the belt tiers 32. When the conveyor belt 22 is configured as a spiral stack 30, heated gaseous cooking medium may travel in a substantially vertical direction through the pervious mesh 42 of each superimposed tier 32. Because of high cooking temperatures and hygiene requirements for food processing equipment, the components of the conveyor belt 22 are typically made from stainless steel. However, other suitable materials that meet the food processing requirements may also be used.

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

As food products are conveyed through a cooking chamber on the conveyor belt 22 (see FIG. 1), they are exposed to a specific cooking environment for a specific period of time to achieve the parameters for each specific product being cooked. In cooking proteins of animal sources (such as beef, fish, and poultry), juices that perspire from the food products may contain a wide range of organic and inorganic by-products, including, but not limited to, blood, fats, water, sugars, enzymes, and seasoning solutions and coatings. These by-products come in contact with the rod 40 and mesh 42 surfaces on the conveyor belt 22, and tend to accumulate as a residue on the conveyor belt 22 as they dry, reduce, concentrate, and caramelize on various surfaces.

Such residue accumulation on the conveyor belt 22 can result in significant process inefficiencies. For example, the residue can become sticky, which may have the effect of binding food products to the rod 40 and mesh 42 surfaces (see FIG. 4). Such binding can lead to damage of the food products, for example, damage to protein tissues and top coatings, as the food products are discharged from the belt mesh 42 at the food product discharge zone 50 (see FIG. 1). Moreover, residue build-up may reduce the belt mesh 42 open area, and in effect, reduce the air passage for the substantially vertical air flow in the cooking oven. Air flow reductions reduce total heat transfer in the system, which results in elongated cooking time to reach target food temperatures, decreasing oven through-put and yield.

While some cooking processes can accommodate residue accumulation until periodic system shut-downs for full system cleaning, other processes require continuous belt cleaning during the cycling of the conveyor belt 22. Regarding the latter, enhanced cleaning assemblies and processes that are incorporated into the cycle of the continuous conveyor belt 22, as described herein, improve both food quality and yield to maximize oven performance.

Figure 3:
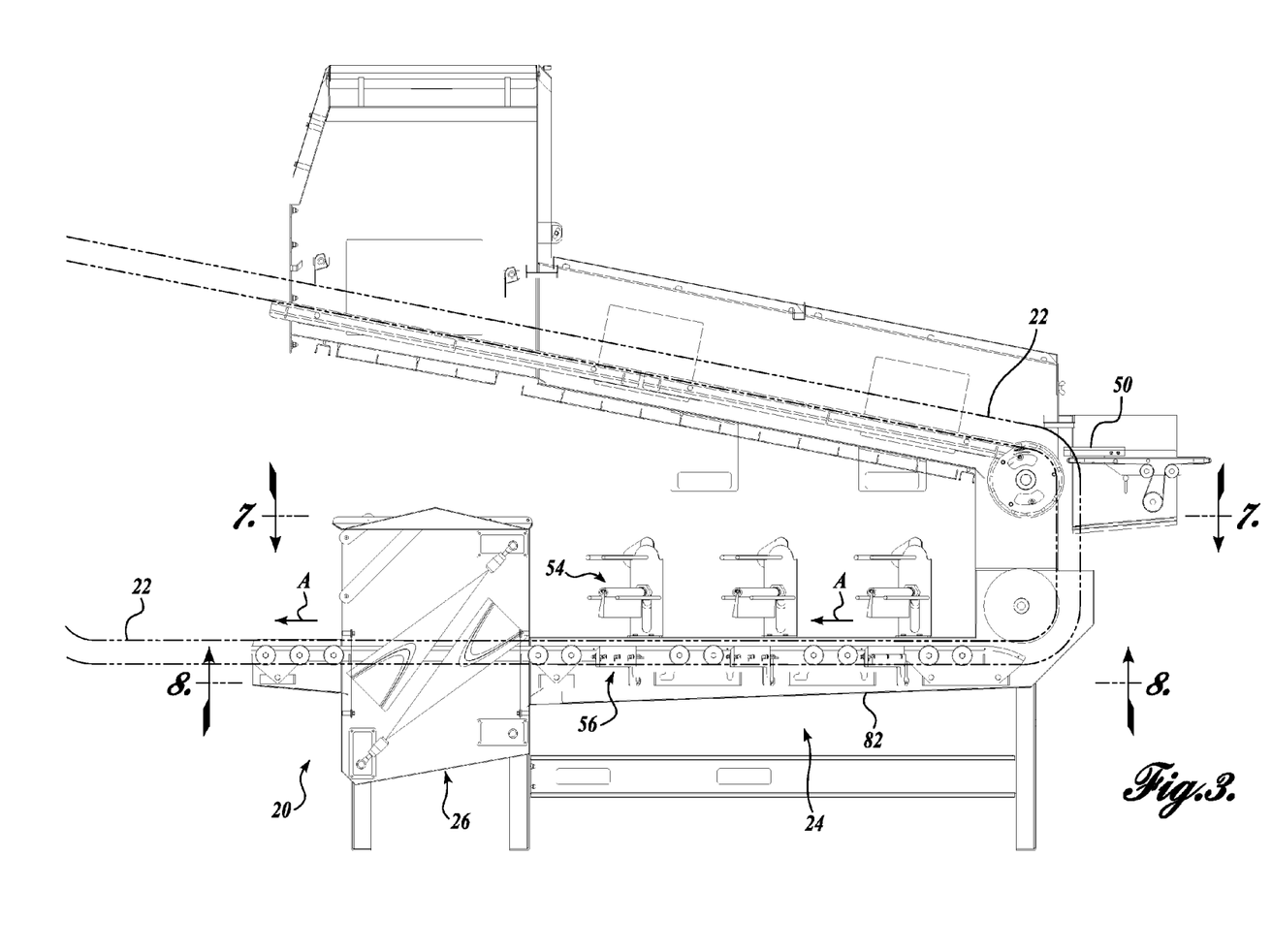
FIG. 3 is a cross-sectional side view of the belt cleaning assembly of FIG. 1, including a contact cleaning assembly and a non-contact cleaning assembly.
Figure 5:
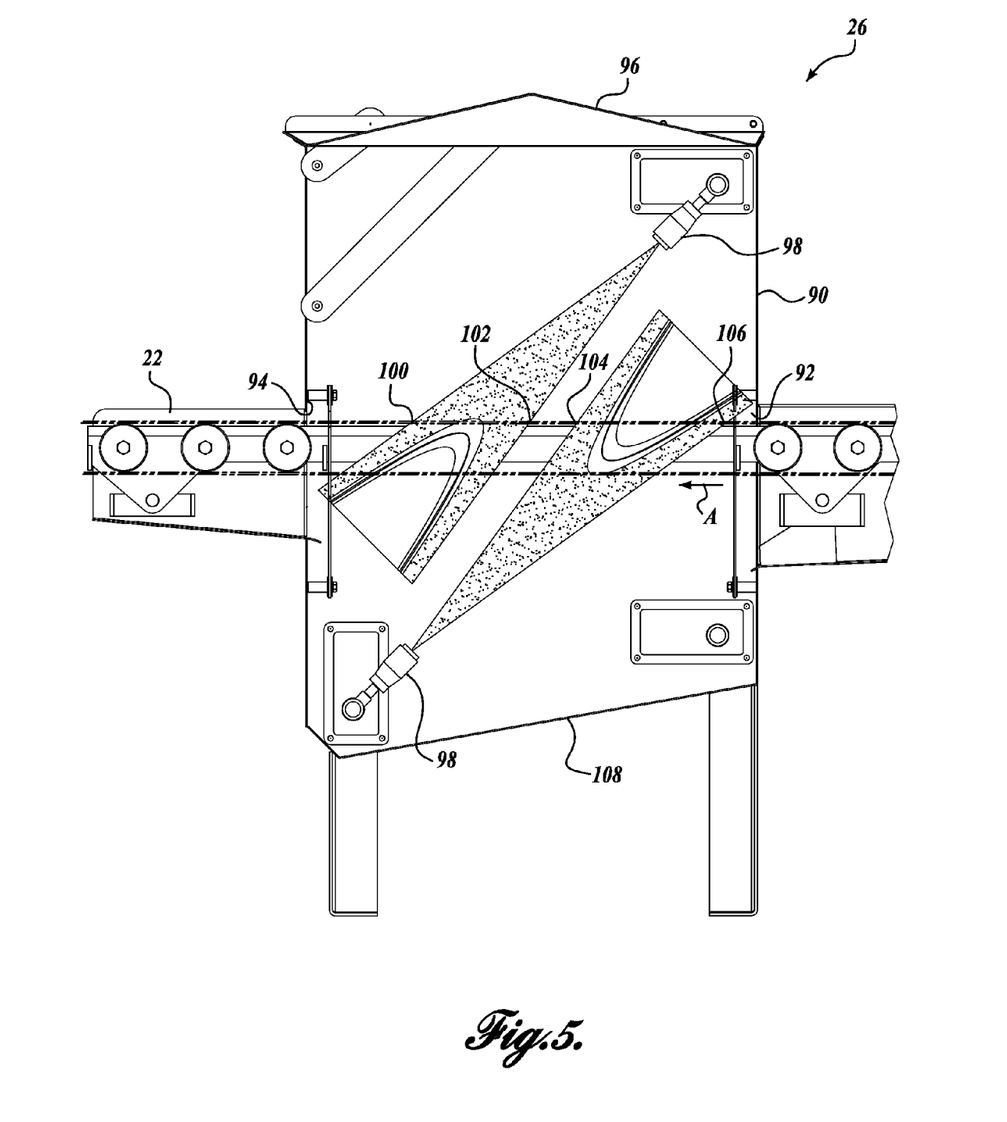
FIG. 5 is a cross-sectional side view of the non-contact cleaning assembly of FIG. 3.

Referring to FIGS. 3 and 5, the contact cleaning assembly 24 will now be described in greater detail. The purpose of the contact cleaning assembly 24 is to mechanically loosen and remove any debris that has collected on the belt 22. The contact cleaning assembly 24 is a mechanically operated cleaning assembly which makes contact with at least one of a first surface 60 (e.g., a top surface as labeled in FIG. 1) and a second surface 62 (e.g., a bottom surface as labeled in FIG. 1) of the conveyor belt 22, and which may penetrate into the wire mesh 42, for example, with brushing bristles. In the illustrated embodiment, the contact cleaning assembly 24 includes a plurality of stationary brush assemblies 54 and scraper assemblies 56 for mechanically cleaning the conveyor belt 22. Although shown as including a plurality of assemblies 54 and 56, it should be appreciated that in another embodiment of the present disclosure, the contact cleaning assembly 24 includes at least one of a brush assembly 54 and scraper assembly 56 for making mechanical contact with at least one of the first and second surfaces 60 and 62 of the belt 22. In yet another embodiment, the contact cleaning assembly 24 includes one brush assembly 54 and one scraper assembly 56 for making mechanical contact with both the first and second surfaces 60 and 62 of the belt 22.

As seen in the illustrated embodiment of FIG. 3, the belt 22 flips after reaching the food product discharge zone 50 and prior to reaching the belt cleaning assembly 20, so that it travels in the upside down position as it returns to the in-feed 36 to spiral stack 30. The brush assemblies 54 and scraper assemblies 56 are positioned relative to the belt 22, with the brush assemblies 54 positioned above the belt 22 to contact the second surface 62 of the belt 22 and the scraper assemblies 56 positioned below the belt 22 to contact the first surface 60 of the belt 22. Although the belt 22 in the illustrated embodiment flips prior to reaching the belt cleaning assembly 20, it should be appreciated that in accordance with other embodiments of the present disclosure, the belt 22 may not be in an upside down position when it enters the belt cleaning assembly 20. For example, the cleaning assembly 20 may be located adjacent the in-feed 36 or the out-feed 38 opening of the cooking chamber. In these configurations, the brush assemblies 54, positioned above the belt 42, would contact the first surface 60 of the belt 22, and the scraper assemblies 56, positioned below the belt 22, would contact the second surface 62 of the belt 22.

The number of brush assemblies 54 and scraper assemblies 56 is selectable to be any optimal number, and the brush assemblies 54 and scraper assemblies 56 are each independently adjustable. In the illustrated embodiment, the brush assemblies 54 and scraper assemblies 56 are configured to be substantially aligned to be co-linear. In that regard, the contact areas of the brush bristles 70 and scraper edges 84 meet the belt 22 at substantially the same line or position along the belt 22. The advantage of being co-linear is that co-linear action creates a pinching effect on the belt 22 between the brush bristles 70 and the scraper edge 84. In that regard, the scraper edge 84 provides a resistance force that allows the brush bristles 70 to press and penetrate the belt 22 resulting in enhanced debris removal and rod 40 and mesh 42 cleaning.

Figure 7:
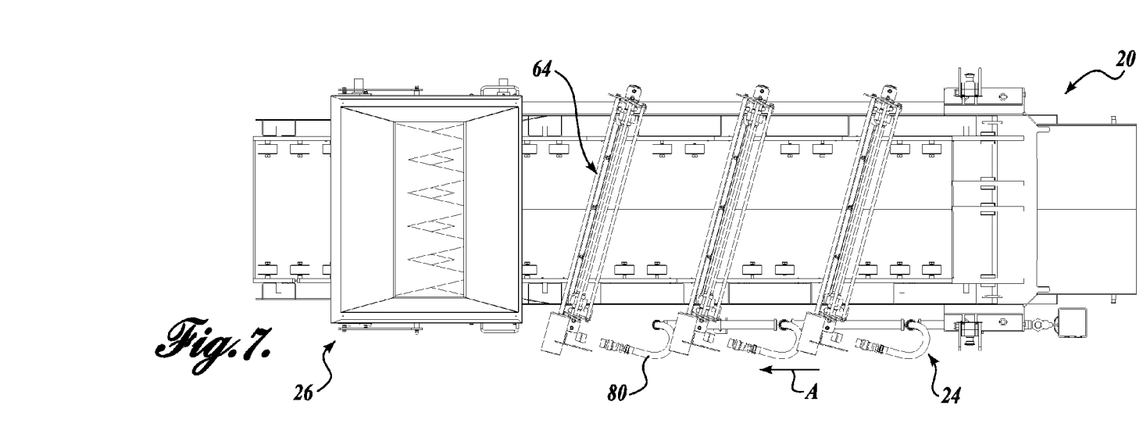
FIGS. 7 and 8 are top and bottom views of the belt cleaning assembly through respective section line indicators 7-7 and 8-8 shown in FIG. 3.
Figure 8:
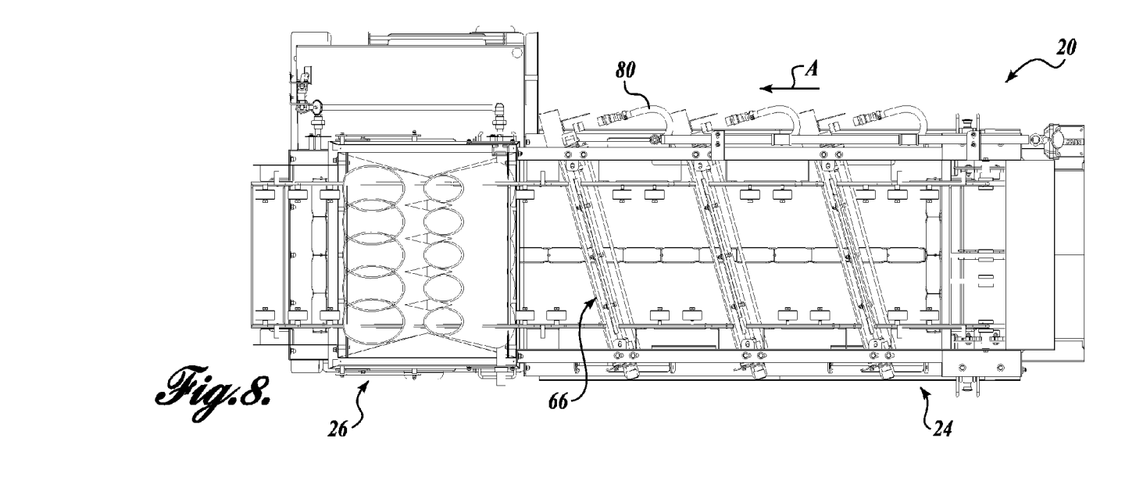

Referring to FIGS. 7 and 8, respective brush assemblies 54 and scraper assemblies 56 may be positioned at an angle relative to the linear direction (indicated by arrow A) of the conveyor belt 22. In the illustrated embodiment, the brush assemblies 54 and scraper assemblies 56 are positioned at about a 15 degree angle relative to an orientation that would be perpendicular to the linear direction of the conveyor belt 22. In another embodiment, the brush assemblies 54 and scraper assemblies 56 are preferably positioned at an angle in the range of about 15 to about 30 degrees relative to an orientation that would be perpendicular to the linear direction of the conveyor belt 22.

The advantage of angular positioning is two-fold. First, in an angled position, the brush 64 and scraper 66 act like plows for loosing residues. In that regard, residues that have been removed are pushed sideways instead of accumulating in front of the brush 64 or scraper 66. Second, the angular positioning reduces the load of traveling debris against the brush 64 or the scraper 66 as compared to perpendicular positioning. However, it should be appreciated that other angular positioning is also within the scope of the present disclosure. Although not optimal positioning, the brush assemblies 54 and scraper assemblies 56 may also be positioned to be substantially perpendicular to the linear direction of the conveyor belt 22.

Each brush 64 includes a brush head 68 and a plurality of brush bristles 70 that extend from the head 68. The bristles 70 are configured to make contact with at least the top surface of the conveyor belt 22 to clean using mechanical action. It should be appreciated, however, that the bristles 70 may also penetrate into the conveyor belt 22 to also clean the rods 40 and the pervious mesh 42. As the conveyor belt 22 runs, the brush assemblies 54 brush the various surfaces of the conveyor belt 22 to clean residue from the belt 22.

As a non-limiting example, a suitable brush design may include bristles made from crimped nylon having a diameter of about 0.036 inches and ends that are deburred. An exemplary brush may further have a length to cover the span of the conveyor belt 22, and a height of about 4 inches. The brush head 68 may be a channel made from a suitable non-corrosive material, such a 7/16 inch stainless steel. However, it should be appreciated that other brush designs are also within the scope of the present disclosure and may depend on the specific application for the cleaning assembly 20.

Each brush 64 is held in place by a brush holder 78, which also serves as a manifold. The brush holder 78 is an elongate cylindrical sleeve having a slot 86 for receiving the brush bristles 70. The brush 64 is received in the brush holder 78 such that the brush head 68 is received in the sleeve and the bristles extend outwardly from the slot 86.

The brush assembly 54 is coupled to a frame 72 by a coupling device 74. In the illustrated embodiment, the coupling device 74 is adjustable to adjust the height of the brush assembly 54 relative to the conveyor belt 22 between engaged and retracted positions (compare FIGS. 6A and 6B). In that regard, the coupling device 74 is positioned in a track or channel 76 for movement between retraced and engaged positions (see arrow B in FIG. 6A). When in the appropriate position, the coupling device 74 can be secured. In the engaged position (see FIG. 6B), the brush bristles 70 make contact with the conveyor belt 22. In the retracted position (see FIG. 6A), the brush bristles 70 do not make contact with the conveyor belt 22, thereby disabling the brushing function of the contact cleaning assembly 24.

Figure 2:
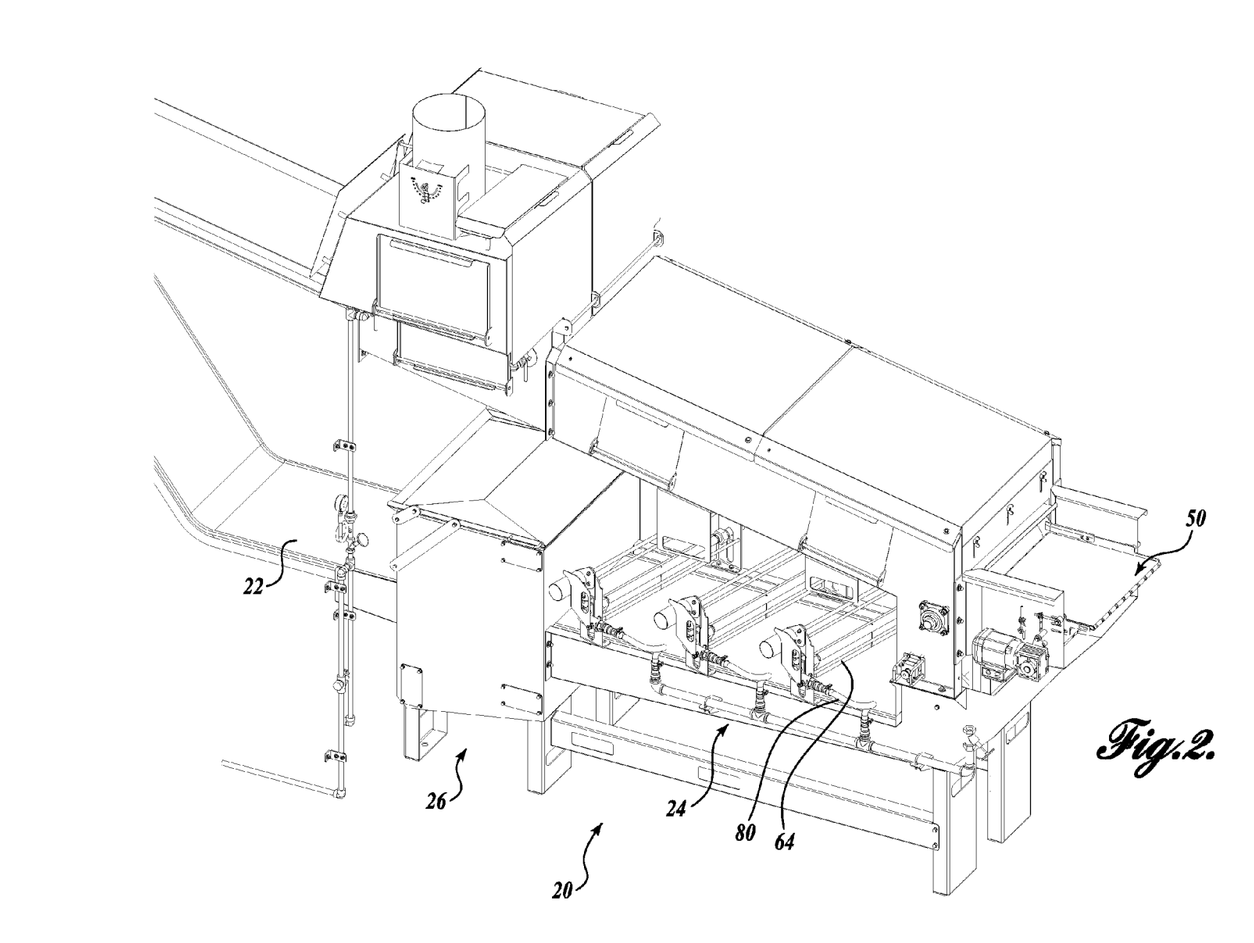
FIG. 2 is an isometric view of the belt cleaning assembly of FIG. 1.

The cleaning operation of the contact cleaning assembly 24 may be further enhanced by the introduction of water into the brushing action. Referring to FIG. 2, a water delivery system 80 delivers potable water to the brush manifold 78, which not only holds the brush 64 in place, but also delivers water to the brush bristles 70 through the slot 86. Such water delivery keeps the belt 22 wet during the cleaning process and, when combined with brushing action, allows for effective scrubbing of the surfaces of the conveyor belt 22. The pressure of the water delivered to the brush manifold 78 may be variable, but is preferably low pressure in the range of 30 to 60 psi.

The continuous running water has two functions in the contact cleaning assembly 24: (1) to wet, soften, and help to wash away the residues from the belt mesh; and (2) to keep the brush assemblies 54 and scraper assemblies 56 clean and cool. Regarding the latter point, if the cleaning system is in use when the oven is operating in cooking mode, the belt mesh 42 may be hot when it enters the contact cleaning assembly 24, potentially damaging the brush bristles 70 and the scraper edges 84. Cool water delivery to the brush bristles 70 and to the scraper edges 84 helps prevent damage to these components. When the brush assemblies 54 are lowered in the channels 76 on the frame 72, bringing the brush bristles 70 in contact with the belt mesh 42, a lever mechanism may be configured to automatically open a potable water supply valve, ensuring that water is fed to the brush bristles 70 keeping them wet and cool.

Referring to FIG. 3, the water that runs through the brush bristles 70 and over the moving mesh belt 22 and the scraper assemblies 56 may be collected in a collection tank 82. The collection tank 82 may be sloped to drain discharge water and the food product debris to a drain or to another collection tank.

The scrapers 66 may be razor scrapers having razor edges 84 that contact the bottom surface of the mesh belt 42. As a non-limiting example, a suitable razor scraper may have a length to cover the span of the conveyor belt 22, an height of about 3 inches, and a width of about 0.5 inches. Moreover, the razor edges may have about a 45 degree edge. However, it should be appreciated that other scraper designs are also within the scope of the present disclosure, and may depend upon the specific application for the cleaning assembly 20. Scrapers may be made from any suitable non-corrosive materials, such as stainless steel, or other stiff plastics, for example, 30% carbon-filled PTFE.

Figure 6A:
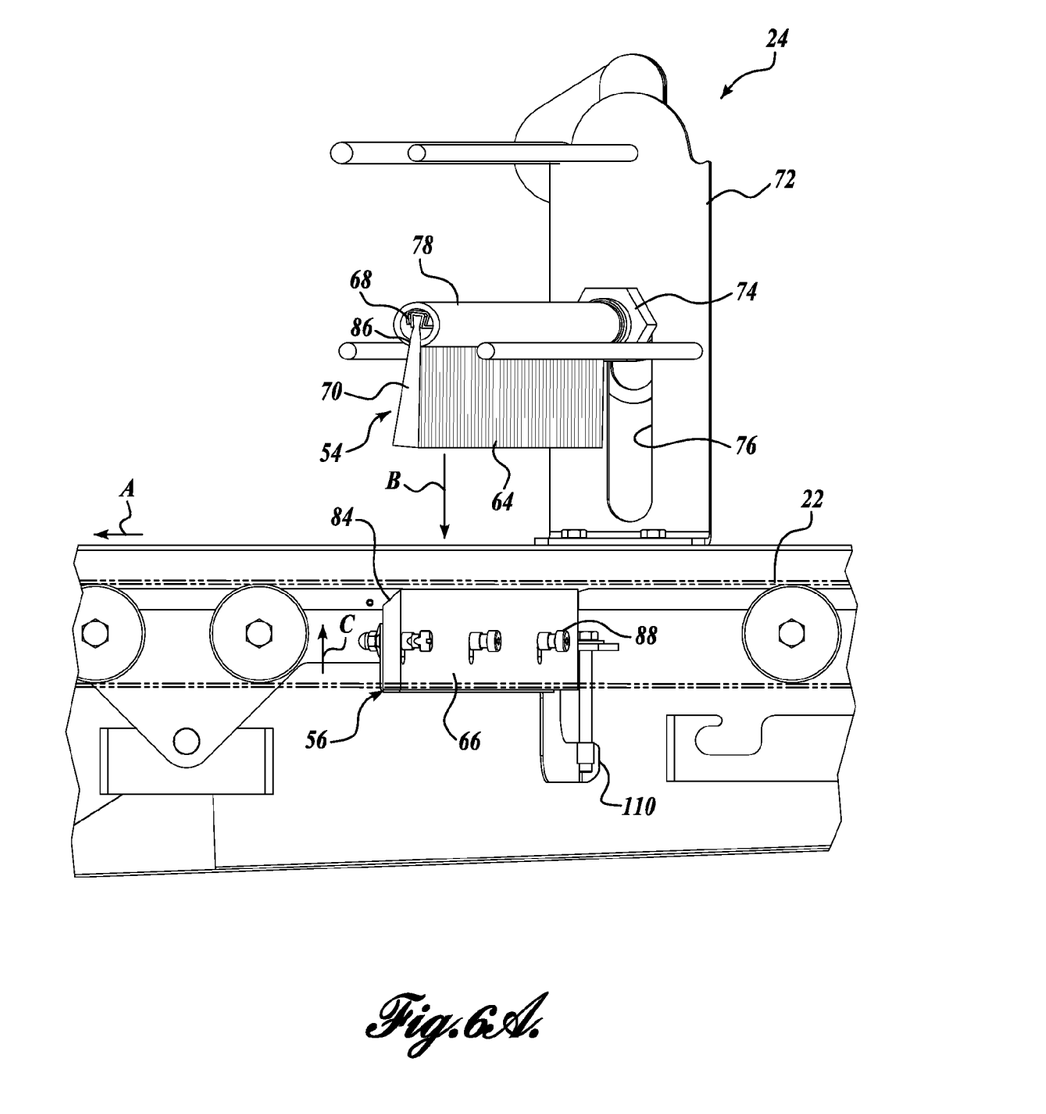
FIGS. 6A and 6B are cross-sectional side views of the contact cleaning assembly of FIG. 3.
Figure 6B:
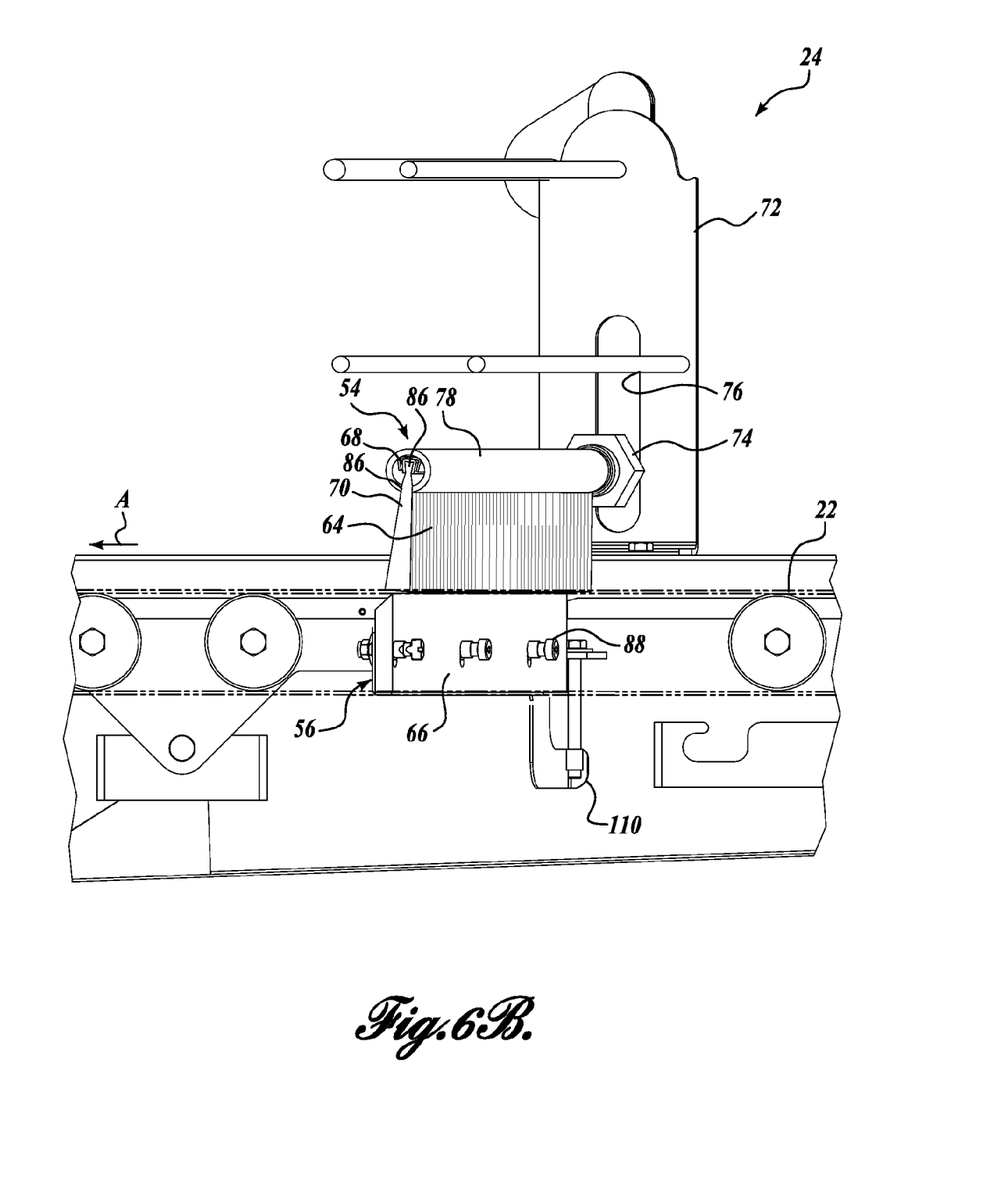

In the illustrated embodiment, the scraper assemblies 56, like the brush assemblies 54, may be fixed in retracted or engaged positions (compare FIGS. 6A and 6B). In that regard, the scraper assemblies 56 include a retraction arm 110 (for retraction to a retracted position), as well as a plurality of adjustable couplings 88 (for fine adjustments and leveling of the scraper 64 relative to the belt 22). When engaged, the scraper assemblies 56 are fixed within the contact cleaning assembly 24 and do not move relative to the belt 22. When retracted, the scraper assemblies 56 do not make contact with the conveyor belt 22, thereby disabling the scraping function of the contact cleaning assembly 24.

In the illustrated application, a brush assembly 54 is not used for the bottom surface of the conveyor belt 22 because an upside down brush tends to collect debris, whereas an upside down scraper does not collect debris. However, it should be appreciated that complementary top and bottom brush assemblies are within the scope of the present disclosure. Likewise, complementary top and bottom scraper assemblies are also within the scope of the present disclosure.

As seen in FIGS. 6A and 6B, the brush assemblies 54 and scraper assemblies 56 in the illustrated embodiment are fixed in an orientation that is substantially vertical and perpendicular to the horizontal path of the belt 22. However, it should be appreciated that the brush assemblies 54 and scraper assemblies 56 may be fixed in a position that is tilted relative to the belt 22. Moreover, if configured with a drive assembly, the brush assemblies 54 may be configured to rotate back and forth relative to the belt 22.

Now referring to FIGS. 2 and 3, the non-contact cleaning assembly 26 will now be described in greater detail. The purpose of the non-contact cleaning assembly 26 is to remove residue remaining after contact cleaning and rinsing the belt 22 in preparation for receiving uncooked food products at the in-feed 36 to the spiral stack 30. The non-contact cleaning assembly 26 is a high pressure water cleaning assembly. As best seen in FIG. 5, the non-contact cleaning assembly is contained in a housing 90 having a belt inlet 92 and a belt outlet 94. In the housing 90, one or more high pressure water jet nozzles 98 are positioned either above or below the belt or both to deliver high pressure water to the belt 22.

Depending on the application and the degree of cleaning required, the number of jet nozzles 98 can vary, water pressure can be adjusted, and jet nozzle 98 location can be selected or configured. Moreover, the water may be delivered at its unheated temperature, or it can be heated, for example, to 160° F. (71° C.), to improve the efficiency for particularly difficult residues. In one embodiment of the present disclosure, the jet water is pressurized to at least about 700 psi by a high pressure pump before being impinged toward the belt rods 40 and belt mesh 42.

The impingement of water onto the belt 22 may be enhanced by the type of high pressure water nozzles used in the system. In the illustrated embodiment, precession nozzles create a flow pattern having circular coverage with a center three dimensional parabolic void. As can be seen in the water pattern shown in FIG. 5, precession nozzles allow for belt cleaning at two different locations 100 and 102 on the belt 22. Likewise, two nozzles (as seen in FIG. 8), allow for belt cleaning at four different locations 100, 102, 104, and 106. As a non-limiting example, one suitable nozzle has a 3 orifice and 1/4 NPT inlet. The spray pattern of the nozzle may be about 25 degrees or greater, with a 0 degree pressure angle. The pressure maximum for such a nozzle is 3000 psi.

In addition, the impingement of water onto the belt 22 may be enhanced by the arrangement of water nozzles in a matrix pattern located above and below the belt 22 so that the high pressure water stream hits the belt mesh from both sides removing all residues that may have accumulated on the wires. In certain configurations, the non-contact cleaning assembly 26 may be configured such that only the top or bottom matrix of spray nozzles is connected to the pump. Such a configuration would be desirable in a case in which light residue has accumulated on the belt, therefore not requiring both top and bottom high pressure water impingement streams. In this case, water will be conserved.

The housing 90 contains water mist as a result of the impact of the water jet streams against the belt 22. The housing 90 may also include an access door 96 for inspection and cleaning, shown as an openable top door in the illustrated embodiment. In that regard, the housing 90 may include seal plates at the inlet and outlet 92 and 94 to and from the housing 90. The housing 90 preferably includes a sloped bottom wall 108 to drain discharge water and the food product debris to a drain or to another collection tank.

It should be appreciated that embodiments of the belt cleaning assembly described herein are configured such that the contact and non-contact cleaning assemblies 24 and 26 may be enabled or disabled to result in three different system options: contact cleaning, non-contact cleaning, and combination contact and non-contact cleaning.

Referring to FIG. 1, the belt 22 reenters the oven chamber (not shown) when traveling from the belt cleaning assembly 20 to the infeed 36 of the oven chamber. If the belt cleaning assembly 20 is operating during production, the high temperature of the oven chamber dries the belt 22 before it arrives at the infeed 36 to receive new food product, without requiring a separate drying apparatus in the system. A clean, dry belt for receiving new food product preserves the quality of the food product to be cooked. It should be appreciated, however, that in other embodiment a separate drying apparatus may be used to dry the belt 22 before entry into the oven chamber.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A belt cleaning assembly for a continuous conveyor belt having a pervious belt assembly and top and bottom belt surfaces, the assembly comprising:
   (a) a contact cleaning assembly, including at least one brush assembly and at least one scraper assembly, wherein the contact cleaning assembly has mechanical contact with both the top and bottom surfaces of the conveyor belt and wherein the at least one brush assembly and the at least one scraper assembly are generally co-linear; and
   (b) a non-contact cleaning assembly including a high pressure water spray directed to the conveyor belt, wherein the non-contact cleaning assembly has non-mechanical contact with at least one of the top and bottom belt surfaces of the conveyor belt.

2. The assembly of claim 1, wherein the at least one brush assembly and one scraper assembly are positioned at an angle relative to the linear direction of the conveyor belt.

3. The assembly of claim 1, wherein the at least one brush assembly is stationary.

4. The assembly of claim 1, wherein the at least one brush assembly includes brush having brush bristles and a water delivery system manifold for delivering water to the brush bristles.

5. The assembly of claim 1, wherein the at least one brush assembly is positionable in engaged and retracted positions.

6. The assembly of claim 1, wherein the at least one scraper assembly is positionable in engaged and retracted positions.

7. The assembly of claim 1, wherein the contact cleaning assembly includes a plurality of brush assemblies and scraper assemblies.

8. A continuous conveyor belt system having a belt cleaning assembly, the system comprising:
   (a) a continuous conveyor belt having a pervious belt assembly and first and second belt surfaces; and (b) a belt cleaning assembly including a contact cleaning assembly including at least one brush and at least one scraper, wherein the contact cleaning assembly has mechanical contact with both the top and bottom surfaces of the conveyor belt and wherein the at least one brush and the at least one scraper are generally co-linear, and a non-contact cleaning assembly including a high pressure water spray directed to the conveyor belt, wherein the non-contact cleaning assembly has non-mechanical contact with the conveyor belt.

9. A method of cleaning a continuous conveyor belt, the method comprising:
   (a) mechanically cleaning the first and second surfaces of the conveyor belt using a contact cleaning assembly including at least one brush assembly and at least one scraper assembly, wherein the at least one brush assembly and the at least one scraper assembly pinch the conveyor belt; and
   (b) hydraulically cleaning the conveyor belt using a non-contact cleaning assembly including a high pressure water spray directed to the conveyor belt, wherein the non-contact cleaning assembly has non-mechanical contact with the conveyor belt.

10. The method of claim 8, further comprising supplying rinse water to the at least one brush assembly.

11. A belt cleaning assembly for a continuous conveyor belt having a pervious belt assembly and top and bottom belt surfaces, the assembly comprising:
   (a) a contact cleaning assembly, including at least one brush assembly and at least one scraper assembly, wherein the contact cleaning assembly has mechanical contact with both the top and bottom surfaces of the conveyor belt and wherein the at least one brush assembly has brush bristles and a water delivery system manifold for delivering water to the brush bristles; and
   (b) a non-contact cleaning assembly including a high pressure water spray directed to the conveyor belt, wherein the non-contact cleaning assembly has non-mechanical contact with at least one of the top and bottom belt surfaces of the conveyor belt.

12. A continuous conveyor belt system having a belt cleaning assembly, the system comprising:
   (a) a continuous conveyor belt having a pervious belt assembly and first and second belt surfaces; and
   (b) a belt cleaning assembly including a contact cleaning assembly including at least one brush and at least one scraper, wherein the contact cleaning assembly has mechanical contact with both the top and bottom surfaces of the conveyor belt and wherein the at least one brush has brush bristles and a water delivery system manifold for delivering water to the brush bristles, and a non-contact cleaning assembly including a high pressure water spray directed to the conveyor belt, wherein the non-contact cleaning assembly has non-mechanical contact with the conveyor belt.

\* \* \* \* \*

UNITED STATES PATENT AND TRADEMARK OFFICE
CERTIFICATE OF CORRECTION

| | | |
|---|---|---|
| PATENT NO. | : 8,348,046 B1 | Page 1 of 1 |
| APPLICATION NO. | : 13/185361 | |
| DATED | : January 8, 2013 | |
| INVENTOR(S) | : Baumgardner et al. | |

It is certified that error appears in the above-identified patent and that said Letters Patent is hereby corrected as shown below:

In the Claims

Col. 8, Line 54, Claim 4, delete "includes brush" and insert --includes a brush--

Signed and Sealed this
Twenty-second Day of April, 2014

Michelle K. Lee
*Deputy Director of the United States Patent and Trademark Office*